(12) United States Patent
Hermanson et al.

(10) Patent No.: US 8,590,950 B2
(45) Date of Patent: Nov. 26, 2013

(54) VEHICLE BUMPER ASSEMBLY WITH A REMOVABLY COUPLED TIE-DOWN RECEIVER

(75) Inventors: Michael C. Hermanson, Northville, MI (US); Dennis E. Runyon, Clinton Township, MI (US); Alfred J. Gryn, Shelby Township, MI (US); Ronald S. Lazarevich, Shelby Township, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 65 days.

(21) Appl. No.: 13/109,123

(22) Filed: May 17, 2011

(65) Prior Publication Data

US 2012/0292930 A1 Nov. 22, 2012

(51) Int. Cl.
*B60D 1/56* (2006.01)
*B60D 1/173* (2006.01)

(52) U.S. Cl.
USPC .................................. 293/102; 293/117

(58) Field of Classification Search
USPC ............. 293/102, 117, 133, 132, 135, 136; 411/2–3, 5, 427; 188/371, 376
See application file for complete search history.

(56) References Cited

U.S. PATENT DOCUMENTS

| | | | |
|---|---|---|---|
| 3,845,527 A * | 11/1974 | Lombardi | 24/575.1 |
| 4,023,823 A | 5/1977 | Saunders | |
| 4,398,322 A | 8/1983 | Ewen | |
| 5,054,806 A * | 10/1991 | Chester | 280/495 |
| 5,529,330 A | 6/1996 | Roman | |
| 5,716,066 A | 2/1998 | Chou et al. | |
| 6,474,522 B1 | 11/2002 | Johnson | |
| 6,643,963 B2 | 11/2003 | Beller | |
| 6,659,518 B2 * | 12/2003 | Ponsonnaille et al. | 293/102 |
| 6,893,063 B2 | 5/2005 | Harrison et al. | |
| 7,137,658 B2 | 11/2006 | Haneda et al. | |
| 7,222,873 B2 | 5/2007 | Rodgers | |
| 7,472,919 B2 * | 1/2009 | Pratt et al. | 280/480.1 |
| 2003/0052493 A1 * | 3/2003 | Ponsonnaille et al. | 293/102 |

* cited by examiner

*Primary Examiner* — Glenn Dayoan
*Assistant Examiner* — Sunsurraye Westbrook
(74) *Attorney, Agent, or Firm* — Frederick A. Krieger

(57) ABSTRACT

A bumper assembly for a vehicle to which a towing hook member can be removably coupled includes a bumper beam having a cavity defined at least partially by a first wall and a second wall. The first and second walls are separated at a distance. Also, the bumper assembly includes a receiver having a receiver opening operable to removably couple to and removably receive the towing hook member. The receiver opening is exposed from the bumper beam, and the receiver also has a first portion and a second portion. The first portion is removably coupled to the first wall of the bumper beam, and the second portion is removably coupled to the second wall of the bumper beam.

20 Claims, 2 Drawing Sheets

VEHICLE BUMPER ASSEMBLY WITH A REMOVABLY COUPLED TIE-DOWN RECEIVER

FIELD

The present invention relates to a tie-down receiver for a vehicle and, more particularly, relates to a removably coupled tie-down receiver.

BACKGROUND

Many vehicles, such as cars, trucks, vans, etc. include a bumper assembly with a bumper beam and a receiver nut fixed thereto. The receiver nut can removably receive an eyebolt or other towing hook member, and the eyebolt can act as a temporary fixture for towing the vehicle and/or for tying down the vehicle during shipping, etc.

In some countries and territories, vehicles are required by law or other motor vehicle regulation to include the receiver nut on the bumper assembly; however, these requirements are not universal throughout the world. Also, some vehicles intended for shipping over long distances (e.g., via ocean-going vessel) need the receiver nut included for attaching the eyebolt so that the vehicle can be tied-down during shipping; however, other vehicles that aren't shipped over long distances may not require the receiver nuts on the bumper assembly.

In most cases, the receiver nut is fixedly and permanently attached to the bumper beam (e.g., via welding). In high-volume vehicle manufacturing, many bumper assemblies for a given vehicle line may typically include a type of fixedly attached receiver nut (e.g. welded to the bumper), regardless of whether the receiver nut is needed or required on the vehicle. Thus, there can be unnecessary parts, labor, and other costs associated with including the permanently fixed receiver nuts on bumper assemblies not requiring the receiver nut.

SUMMARY

A bumper assembly for a vehicle to which a towing hook member can be removably coupled is disclosed. The bumper assembly includes a bumper beam having a cavity defined at least partially by a first wall and a second wall. The first and second walls are separated at a distance. Also, the bumper assembly includes a receiver having a receiver opening operable to removably couple to and removably receive the towing hook member. The receiver opening is exposed from the bumper beam, and the receiver also has a first portion and a second portion. The first portion is removably coupled to the first wall of the bumper beam, and the second portion is removably coupled to the second wall of the bumper beam.

In one aspect of this disclosure, the first end includes an external threading, and wherein the removable member is a threaded nut that threadably couples to the external threading.

In one aspect of this disclosure, the receiver includes an anti-rotation feature that limits rotation of the receiver relative to the bumper beam about an axis of the receiver.

A method of assembling a bumper assembly is disclosed. The method includes providing a bumper beam having a cavity defined at least partially by a first wall and a second wall. The first and second walls are separated at a distance. The method also includes providing a receiver with a receiver opening that is operable to removably couple to and removably receive a towing hook member. Also, the method includes extending the receiver between both the first and second walls, leaving the receiver opening exposed from the bumper beam. Still further, the method includes removably coupling a first portion of the receiver to the first wall and removably coupling a second portion of the receiver to the second wall.

Further areas of applicability of the present disclosure will become apparent from the detailed description, drawings and claims provided hereinafter. It should be understood that the detailed description, including disclosed embodiments and drawings, are merely exemplary in nature, intended for purposes of illustration only, and are not intended to limit the scope of the invention, its application, or use. Thus, variations that do not depart from the gist of the invention are intended to be within the scope of the invention.

DETAILED DESCRIPTION

Figure 1:
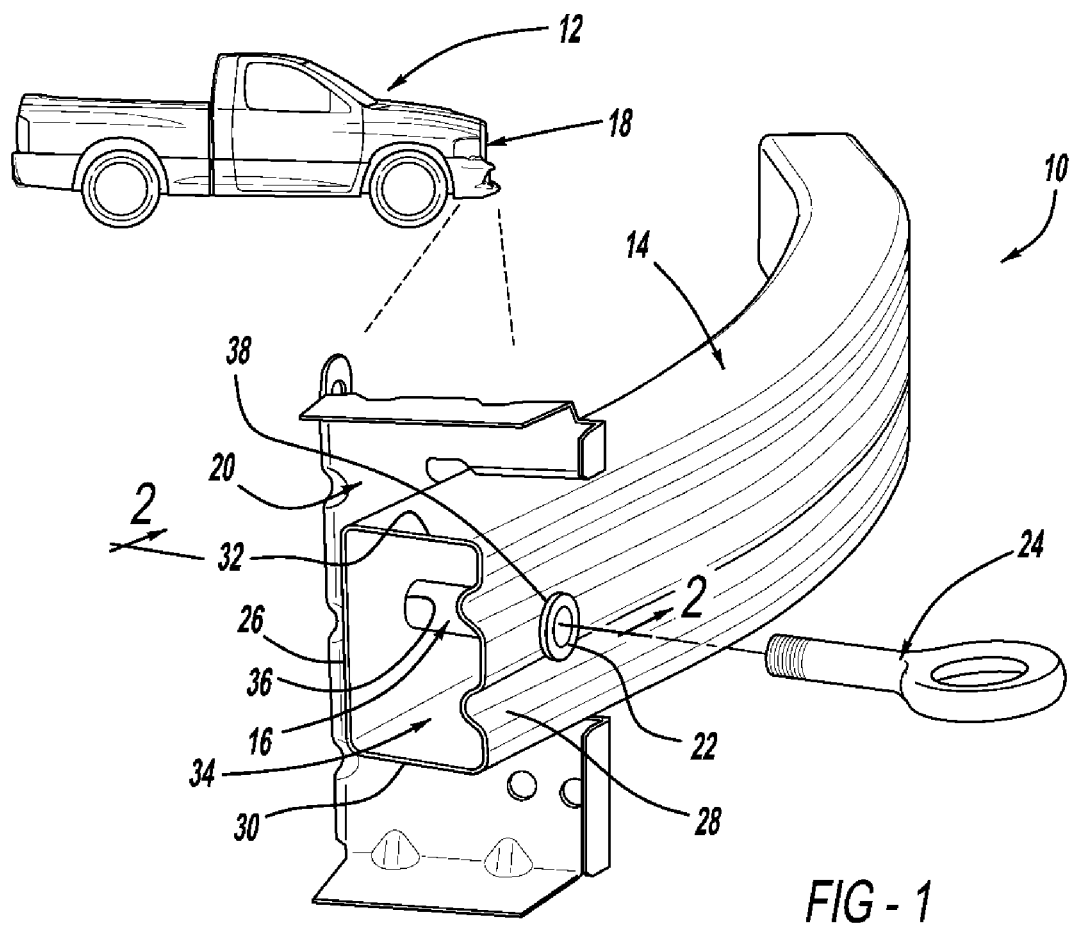
FIG. 1 is a side perspective view of a bumper assembly of a vehicle according to the present disclosure.

Referring initially to FIG. 1, a bumper assembly 10 for a vehicle 12 is illustrated according to various exemplary embodiments. The bumper assembly 10 generally includes a bumper beam 14 and at least one or more receivers 16 (i.e., receiver nuts, etc.). Only one receiver 16 is shown in FIG. 1; however, it will be appreciated that the bumper assembly 10 can include any number of receivers 16 and the discussion below can apply to any of the receivers 16 on the vehicle 12.

The bumper beam 14 can extend across and reinforce an end 18 (e.g., a front or rear end) of the vehicle 12. The bumper beam 14 can be hung and fixedly coupled to the frame (not shown) of the vehicle 12 via one or more bumper brackets 20.

Figure 2:
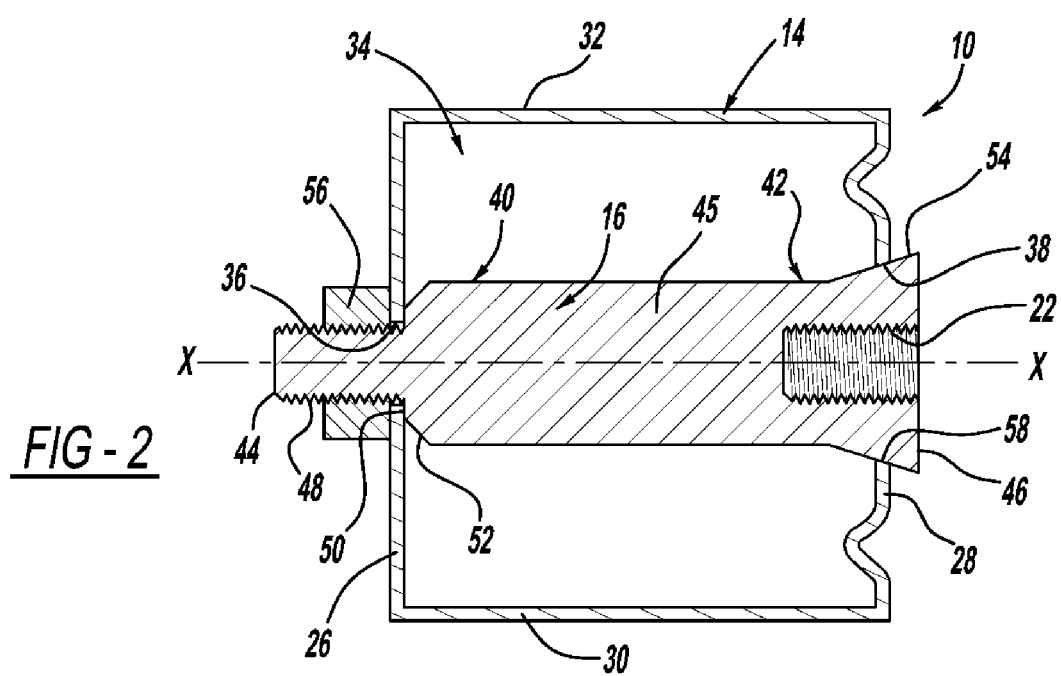
FIG. 2 is a section view of the bumper assembly taken along line 2-2 of FIG. 1.

Also, the receiver 16 can be removably coupled to the bumper beam 14 as will be discussed. Also, as shown in FIGS. 1 and 2, the receiver 16 can include a receiver opening 22 that is exposed from the bumper beam 14. The receiver opening 22 can removably receive a towing hook member 24 or other tie-down member (e.g., an eyebolt). As such, the towing hook member 24 can temporarily and removably couple to the bumper beam 14 via the receiver 16. For instance, should the vehicle 12 become disabled, the towing hook member 24 can be temporarily attached to the vehicle 12 for towing the vehicle 12.

As mentioned above, the receiver 16 is removably coupled to the bumper beam 14. As such, the bumper assembly 10 and the vehicle 12 can be selectively manufactured and assembled with or without receivers 16. For instance, if the vehicle 12 is intended for overseas shipment or in areas where the receivers 16 are required by law or otherwise, the receivers 16 can be included on the bumper assembly 10. However, if the vehicle 12 is not intended for long distance shipping and/or is intended for use where there are no requirements for receivers 16, then the bumper assembly 10 need not include the receivers 16. Accordingly, there can be significant overall cost savings because the receivers 16 are optionally included on the vehicle 12 during vehicle manufacturing.

It will be appreciated that although the vehicle 12 illustrated is a pickup truck, it will be appreciated that the vehicle 12 can be a car, a van, or any other type of vehicle 12. Also, although the receiver 16 is illustrated for use at the front end 18 of the vehicle 12, it will be appreciated that the one or more receivers 16 can be applied to other areas of the vehicle 12.

In an exemplary embodiment and referring now to FIGS. 1 and 2, the bumper beam 14 will be discussed in greater detail. The bumper beam 14 as shown can include a hollow, rigid, straight, curved, and elongated sections. The bumper beam 14 can be made out of steel and can be formed by an extrusion process. For example, in cross section, the bumper beam 14 can include a first (inner) wall 26, a second (outer) wall 28, a first connecting wall 30, and a second connecting wall 32. The first and second walls 26, 28 can be generally vertical walls that face each other, wherein the first wall 26 is disposed closer to the center of the vehicle 12 than the second wall 28. The first and second connecting walls 30, 32 can be generally horizontal walls that face each other and that extend between the first and second walls 26, 28. As such, the first and second walls 26, 28 can be spaced apart at a distance from each other, and the first and second connecting walls 30, 32 can be spaced apart at a distance from each other. Each of the walls 26, 28, 30, 32 can extend along a length of the bumper beam 14. The walls 26, 28, 30, 32 can have any suitable thickness, such as approximately ⅛ inches.

The walls 26, 28, 30, 32 can define a cavity 34 therein. In the embodiments illustrated, the cavity 34 is somewhat B-shaped. However, it will be appreciated that the cavity 34 can have any other desired shape.

As is most clearly shown in FIG. 2, the first wall 26 can include a first bumper beam opening 36, and the second wall 28 can include a second bumper beam opening 38. The openings 36, 38 can both be of any suitable configuration, such as substantially circular through-holes. The openings 36, 38 can also be substantially aligned with each other.

Figure 3:
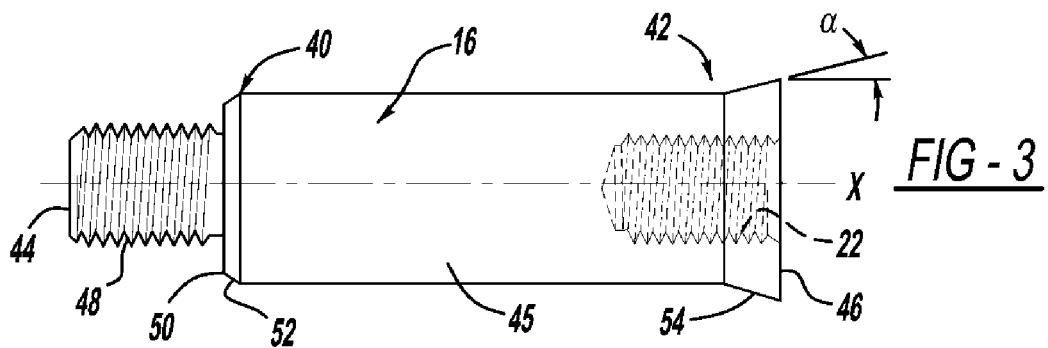
FIG. 3 is a side view of a receiver the bumper assembly of FIG. 1.

Referring now to FIGS. 1-3, the receiver 16 will be discussed in greater detail. In an exemplary embodiment, the receiver 16 can be a monolithic, axially straight, substantially cylindrical member made of a rigid material, such as steel. The receiver 16 can generally include a first portion 40 and a second portion 42 (FIGS. 2 & 3). As will be discussed, the first portion 40 removably couples to the first wall 26 of the bumper beam 14, and the second portion 42 removably couples to the second wall 28 of the bumper beam 14.

As shown in FIG. 3, the first portion 40 of the receiver 16 terminates at a first end 44, and the second portion 42 terminates at a second end 46. Also, a shank 45 extends partially across both the first and second portions 40, 42. The shank 45 can have a substantially constant width (e.g., diameter). A longitudinal axis X of the receiver 16 can be substantially straight and can extend between both the first and second ends 44, 46.

The first end 44 of the receiver 16 can include an external threading 48. Also, a first shoulder 50 can be defined between the shank 45 and the threading 48. The first end 44 can extend from the first shoulder 50. The first shoulder 50 can include a chamfered edge 52.

The second end 46 of the receiver 16 can include the receiver opening 22. The receiver opening 22 can be a recess or hole that extends from the second end 46, that is substantially centered on the axis X, and that is internally threaded.

Also, a tapered surface 54 can be included adjacent the second end 46. The tapered surface 54 can taper such that the second end 46 is wider than the shank 45. Also, the tapered surface 54 can taper at an acute angle α (FIG. 3) relative to the axis X. The angle α can be of any suitable value, such as approximately ten degrees (10°).

The receiver 16 can be removably coupled to the first and second walls 26, 28 of the bumper beam 14 in any suitable fashion. For instance, as shown in FIG. 2, the first bumper beam opening 36 can receive the first end 44. Also, a removable member 56, such as a threaded nut (lock nut or freely-spinning nut) can be threadably coupled to the threading 48 such that the receiver 16 is removably retained between the first wall 26 and the first shoulder 50 of the receiver 16. Also, the second bumper beam opening 38 can removably receive the second end 46 of the receiver 16. More specifically, the tapered surface 54 can abut against an inner surface 58 (FIG. 2) of the second bumper beam opening 38. In some embodiments, this abutment generates friction enough to limit rotation of the receiver 16 about its axis X. As such, the tapered surface 54 can be press fit or frictionally fit within the second bumper beam opening 38. If the full width (e.g., diameter) of the tapered surface 38 at the second end 46 is significantly wider than the width (e.g., diameter) of the second bumper beam opening 38, the tapered surface 38 can also be coupled to the second wall 28 via an interference fit. In another exemplary embodiment, one or more of the bumper walls can include a threaded hole portion configured to receive a complimentary threaded exterior portion of the receiver.

The length of the shank 45 can be sufficient such that the first and second portions 40, 42 of the receiver 16 can simultaneously couple to the first and second walls 26, 28, respectively. As such, forces within the receiver 16 (axial loads, transverse loads, bending loads, and torsion loads) can be distributed through both the first and second walls 26, 28 of the bumper beam 14. In some embodiments, the first portion 40 of the receiver 16 and the removable member 56 can generate a clamp load sufficient enough to prevent loosening of the receiver 16, and the second portion 42 of the receiver 16 can press or frictionally fit into the second bumper beam opening 38 to prevent movement of the receiver 16 and prevent fatigue failure. Accordingly, the bumper assembly 10 can be robust and can perform without failure during use (during towing and shipping of the vehicle, etc.).

Also, because the receiver 16 is removably coupled to the bumper beam 14, the receiver 16 can be an optional feature of the vehicle 12. Thus, one or more receivers 16 can be included if the vehicle 12 is intended for use in a territory where receivers 16 are required and/or if the vehicle 12 is shipped over long distances. However, the receivers 16 need not be installed if the receivers 16 are unnecessary. Accordingly, there can be substantial cost savings over current receivers that are permanently fixed (e.g., welded) to the bumper beam.

During installation of the receiver 16, the first end 44 can be received in the first bumper beam opening 36, and the removable member 56 can be threadably coupled to the threading 48. Attaching the removable member 56 in this manner will draw the tapered surface 54 deeper into the second bumper beam opening 38 to further engage and secure the tapered surface 54 against the inner surface 58 of the second bumper beam opening 38. Once installed, the receiver 16 and the removable member 56 can remain substantially static relative to the bumper beam 14.

In some embodiments, the shank 45 may need to be retained against rotation (e.g., by hand) while the removable member 56 is first threaded onto the threading 48. However, after a small amount of rotation (e.g., ½ turn, etc.) of the removable member 56, friction between the tapered surface 54 and the inner surface 58 of the second bumper beam opening 38 can be sufficient to limit (e.g., lock) the receiver 16 against rotation about its axis X such that the removable member 56 can be fully threaded onto the receiver 16 and such that the first wall 26 can be fully secured between the shoulder 50 and the removable member 56. Accordingly, the receiver 16 can be fairly easy to install.

It will be appreciated that the receiver 16 can be removably coupled to the bumper beam 14 without a washer (e.g., regular washer, lock washer, etc.); however, in other embodiments, one or more washers can be employed for further distributing forces within the bumper assembly 10. Also, additional hardware can be included for maintaining the receiver 16 in tension such that the receiver 16 is unlikely to loosen over time.

If necessary, the receiver 16 can be removed from the bumper beam 14 fairly easily as well. The removable member 56 can simply be unthreaded from the first end 44, and the receiver 16 can be axially pulled such that the receiver 16 moves out of both openings 36, 38. As discussed above, the friction between the tapered surface 54 and the inner surface 58 of the second bumper beam opening 38 can be sufficient to hold the receiver 16 against rotation while the removable member 56 is unthreaded from the first end 44. Also, a tool (e.g., a hammer or other blunt instrument) can be used to apply a small axial force directed from the first end 44 toward the second end 46 to loosen the second end 46 from the second bumper beam opening 38 if necessary.

Figure 4:
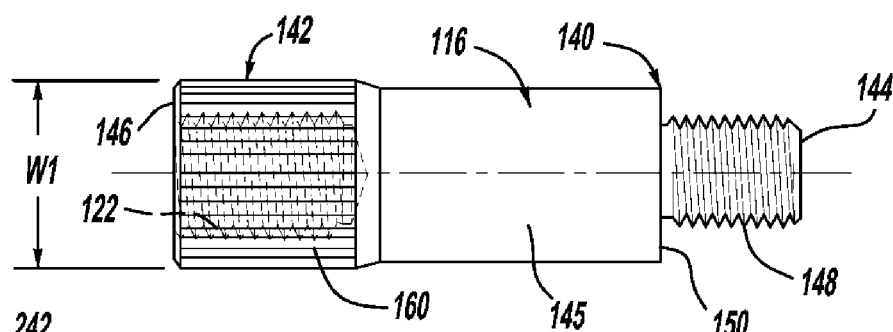
FIG. 4 is a side view of the receiver according to additional exemplary embodiments of the present disclosure.

Referring now to FIG. 4, another exemplary embodiment of receiver 116 will be discussed. Features that correspond to those of the embodiments of FIGS. 1-3 are indicated with corresponding reference numbers increased by 100.

As shown, the receiver 116 includes a first end 144 and shoulder 150 similar to the embodiments of FIGS. 1-3. However, the second end 146 has a substantially constant width W1 (e.g., diameter). The width W1 can be substantially equal to a width of the second bumper beam opening 38. Also, the second end 146 can include a knurled surface 160. Because it is knurled, the surface 160 can include small projections that can deform against the inner surface 58 of the second bumper beam opening 38 for added friction therebetween. In other embodiments, the second end 146 is not knurled, rather, the second end 146 has a width that closely matches that of the opening 38 to establish the frictional fit therein.

Figure 5:
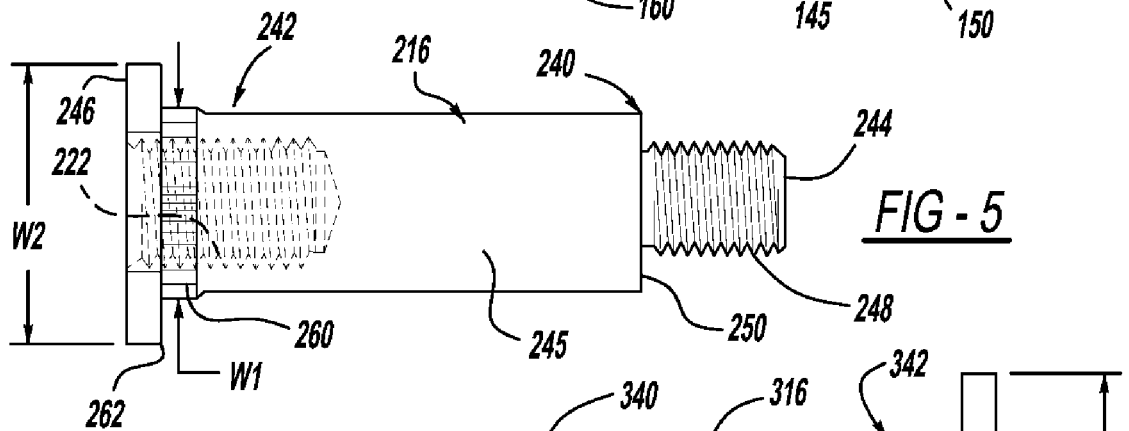
FIG. 5 is a side view of the receiver according to additional exemplary embodiments of the present disclosure.

Referring now to FIG. 5, another exemplary embodiment of receiver 216 will be discussed. Features that correspond to those of the embodiments of FIGS. 1-3 are indicated with corresponding reference numbers increased by 200, and features that correspond to those of the embodiments of FIG. 4 are increased by 100.

As shown, the receiver 216 includes a first end 244 and shoulder 250 similar to the embodiments of FIGS. 1-4. Also, the receiver 216 includes the knurled surface 260 having a width W1, similar to the embodiments of FIG. 4. However, the second end 246 additionally includes a second shoulder 262 of a substantially constant width W2 (e.g., diameter). The width W2 can be greater than the width of the second bumper beam opening 38. Accordingly, the second shoulder 262 can abut against the second wall 28 of the bumper beam 14, and the knurled surface 260 can abut against the inner surface 58 (interference fit) of the second bumper beam opening 38 to removably couple the second portion 242 of the receiver 16 to the second wall 28 of the bumper beam 14.

Figure 6:
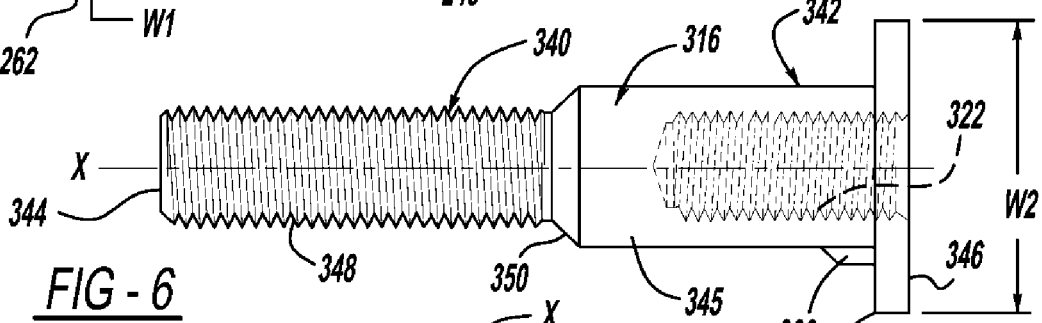
FIG. 6 is a side view of the receiver according to additional exemplary embodiments of the present disclosure.
Figure 7:
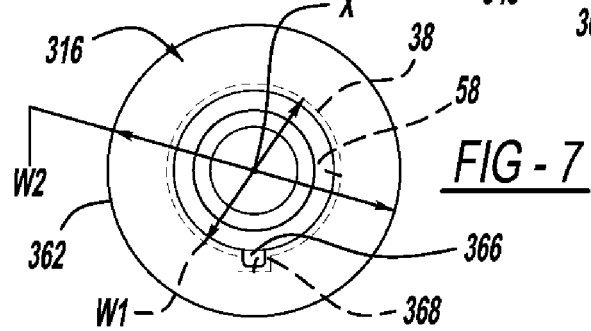
FIG. 7 is an end view of the receiver of FIG. 6.

Referring now to FIGS. 6 and 7, another exemplary embodiment of receiver 316 will be discussed. Features that correspond to those of the embodiments of FIGS. 1-3 are indicated with corresponding reference numbers increased by 300, and features that correspond to those of the embodiments of FIG. 5 are indicated by corresponding reference numbers increased by 100.

As shown, the receiver 316 can be substantially similar to the embodiment illustrated in FIG. 5. However, the threading 348 on the first end 344 can be longer in comparison. As such, when the receiver 316 is removably coupled to the bumper beam 14, the first wall 26 and the second wall 28 can be compressed toward each other between the removable member 56 (not shown) and the second shoulder 362. The first shoulder 350 need not abut the first wall 26.

Moreover, the receiver 316 can include an anti-rotation feature 366. The anti-rotation feature 366 can be a projection that projects radially away from the axis X and can extend partially along the axis X away from the second shoulder 362. As shown in FIG. 7, the anti-rotation feature 366 can be received within (i.e., keyed to) a notch 368 (shown in phantom) defined in the second bumper beam opening 38 of the bumper beam 14. Accordingly, the anti-rotation feature 366 can abut against the inner surface 58 of the second bumper beam opening 38 to limit rotation of the receiver 316 about the axis X to facilitate installation of the receiver 316 on the bumper beam 14. It will be appreciated that the anti-rotation feature 366 could be received in a notch 368 formed in the first bumper beam opening 36 similar to the embodiments shown in FIG. 7.

In summary, the receiver 16, 116, 216, 316 can easily be installed on the bumper assembly 10 of the vehicle 12. Because the receiver 16, 116, 216, 316 is removably coupled, the receiver 16, 116, 216, 316 can be an optional component for the vehicle 12 and can be included only as needed. Accordingly, the bumper assembly 10 and the vehicle 12 can be manufactured and assembled in a more cost effective manner.

What is claimed is:

1. A bumper assembly for a vehicle to which a hook member can be removably coupled, the bumper assembly comprising:
    a bumper beam having a cavity defined at least partially by a first wall and a second wall, the first and second walls separated at a distance; and
    a receiver having a receiver opening operable to removably couple to and removably receive the towing hook member, the receiver opening being exposed from the bumper beam, the receiver also having a first portion and a second portion, the first portion removably coupled to the first wall of the bumper beam via a threaded connection, the second portion removably coupled to the second wall of the bumper beam.

2. The bumper assembly of claim 1, wherein at least one of the first wall and the second wall includes a bumper beam opening that receives the receiver.

3. The bumper assembly of claim 2, wherein the first wall includes a first bumper beam opening, wherein the first portion of the receiver includes a first shoulder, a first end extending from the first shoulder, and a removable member that removably couples to the first end, wherein the first end extends through the first bumper beam opening, and wherein the first wall is removably retained between the first shoulder and the removable member.

4. The bumper assembly of claim 3, wherein the first end includes an external threading, and wherein the removable member is a threaded nut that threadably couples to the external threading.

5. The bumper assembly of claim 2, wherein the second wall includes a second bumper beam opening, wherein the second portion of the receiver is received within the second bumper beam opening, and wherein the second portion removably couples to the second wall via a frictional fit.

6. The bumper assembly of claim 5, wherein the second portion of the receiver includes a knurled surface that abuts against an inner surface of the second bumper beam opening to frictionally fit therewith.

7. The bumper assembly of claim 5, wherein the second portion of the receiver includes a tapered surface that abuts against an inner surface of the second bumper beam opening to frictionally fit therewith.

8. The bumper assembly of claim 2, wherein the second wall includes a second bumper beam opening through which the second portion of the receiver extends, the second portion including a second shoulder, the second shoulder having a second shoulder width that is greater than a second bumper beam opening width of the second bumper beam opening.

9. The bumper assembly of claim 1, wherein the receiver includes an anti-rotation feature that limits rotation of the receiver relative to the bumper beam about an axis of the receiver.

10. The bumper assembly of claim 9, wherein at least one of the first wall and the second wall includes a bumper beam opening with a notch, wherein the receiver is received within the bumper beam opening, and wherein the anti-rotation feature is a protrusion that is received within the notch to limit rotation of the receiver relative to the bumper beam about the axis of the receiver.

11. The bumper assembly of claim 1, wherein the receiver opening is an internally threaded opening that extends from the second portion of the receiver, the receiver opening operable to threadably couple to the towing hook member.

12. The bumper assembly of claim 1, wherein the receiver has a substantially straight axis.

13. The bumper assembly of claim 1, wherein the first wall of the bumper beam is an inner wall, wherein the second wall of the bumper beam is an outer wall, wherein the bumper beam includes a first connecting wall and a second connecting wall, wherein the first and second connecting walls each extend between the inner and outer walls, wherein the first and second connecting walls are separated at a distance, and wherein the cavity of the bumper beam is defined between the inner wall, the first connecting wall, the outer wall, and the second connecting wall.

14. A method of assembling a vehicle bumper assembly comprising:
providing a bumper beam having a cavity defined at least partially by a first wall and a second wall, the first and second walls separated at a distance;
providing a receiver with a receiver opening that is operable to removably couple to and removably receive a towing hook member;
extending the receiver between both the first and second walls, leaving the receiver opening exposed from the bumper beam;
threadably coupling a first portion of the receiver to the first wall; and
removably coupling a second portion of the receiver to the second wall.

15. The method of claim 14, wherein extending the receiver between both the first and second walls includes extending the receiver through a first bumper beam opening in the first wall and through a second bumper beam opening in the second wall.

16. The method of claim 15, wherein threadably coupling the first portion of the receiver to the first wall includes removably coupling a removable member to a first end of the receiver to removably retain the first wall between the removable member and a first shoulder of the receiver.

17. The method of claim 16, wherein the first end includes an external threading, wherein the removable member is a threaded nut, and wherein threadably coupling the removable member includes threadably coupling the threaded nut to the external threading of the retainer.

18. The method of claim 17, wherein threadably coupling the threaded nut to the external threading of the retainer includes turning the nut onto the external threading while the second portion of the retainer is frictionally held against rotation by the second wall.

19. The method of claim 14, wherein removably coupling the second portion of the receiver includes frictionally fitting the second portion to the second wall of the bumper beam.

20. The method of claim 14, wherein removably coupling the second portion of the receiver includes drawing the second portion of the retainer into further engagement with the second wall of the bumper beam.

* * * * *